June 7, 1938. S. K. HOFFMAN ET AL 2,119,879
FUEL INJECTOR FOR INTERNAL COMBUSTION ENGINES
Filed Nov. 19, 1934   3 Sheets-Sheet 1
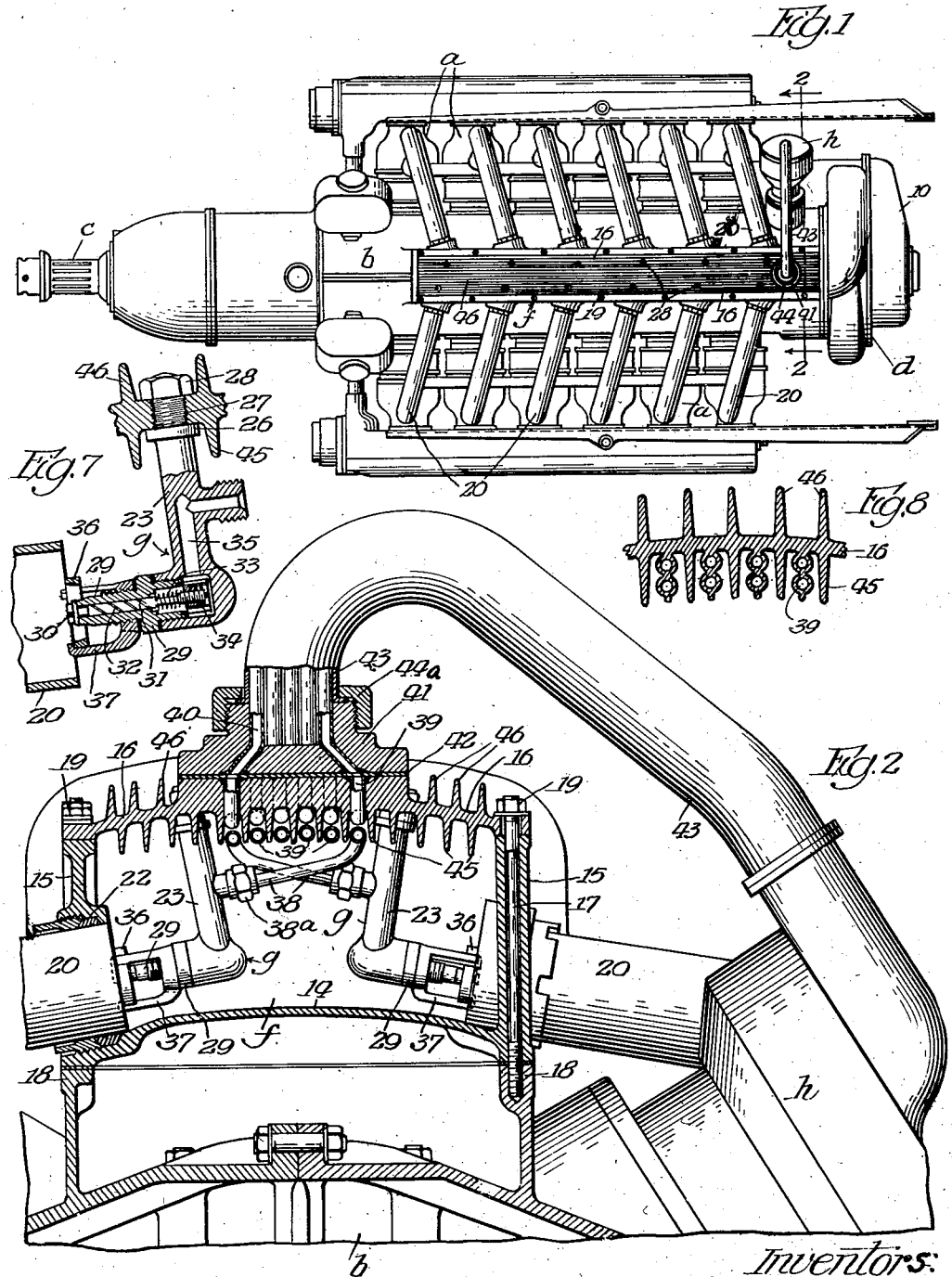
Inventors:
Samuel K Hoffman &
Clarence H. Wiegman
By Fred Gerlach Atty June 7, 1938. S. K. HOFFMAN ET AL 2,119,879
FUEL INJECTOR FOR INTERNAL COMBUSTION ENGINES
Filed Nov. 19, 1934 3 Sheets-Sheet 2
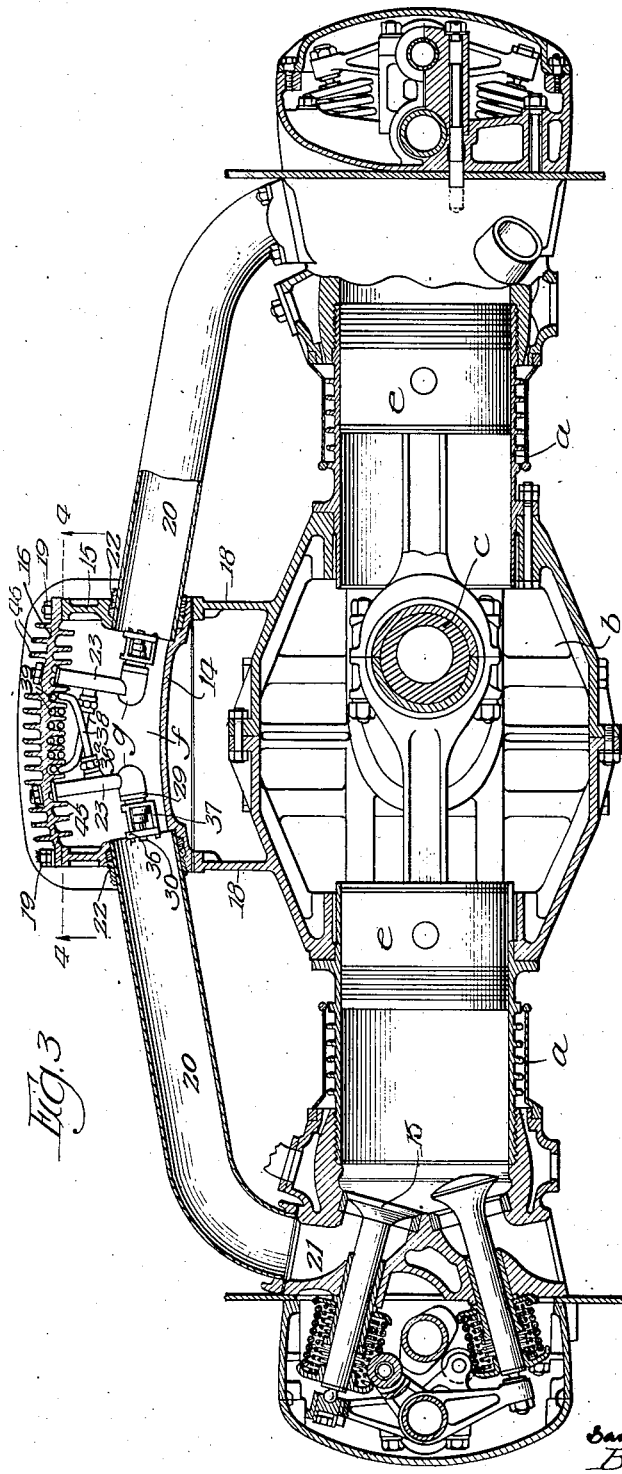
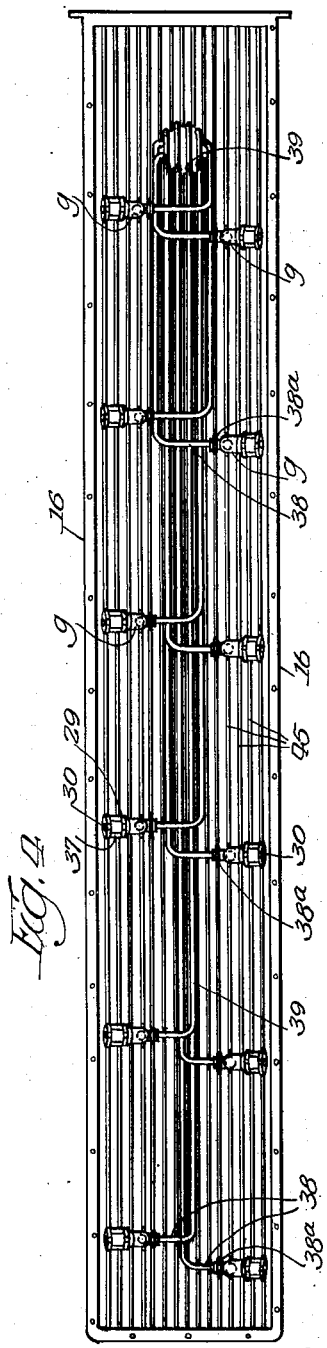
Inventors:
Samuel K. Hoffman &
Clarence H. Wiegman
By Fred Gerlach their Atty.

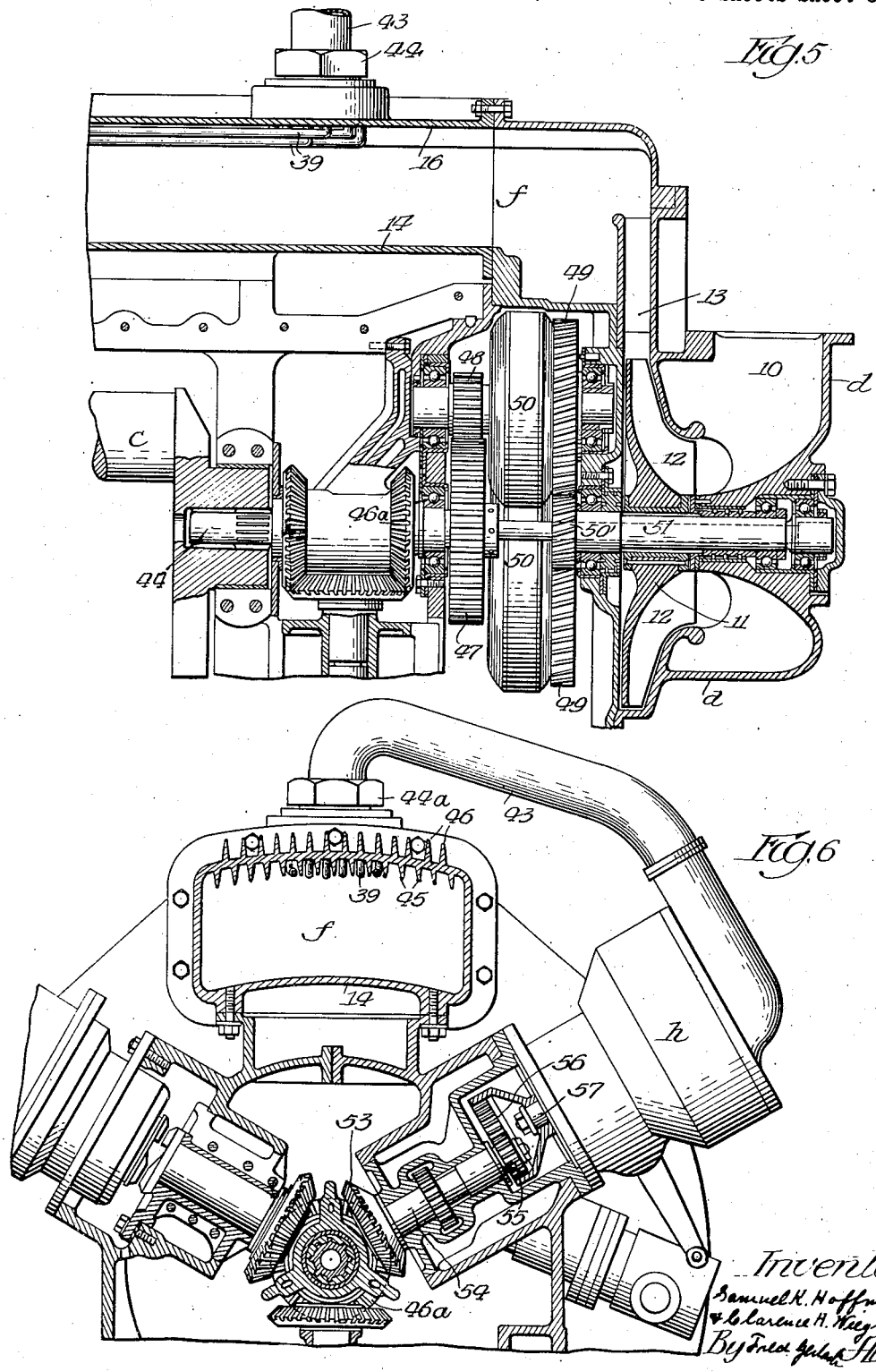

Patented June 7, 1938

2,119,879

UNITED STATES PATENT OFFICE 2,119,879

FUEL INJECTOR FOR INTERNAL COMBUSTION ENGINES

Samuel K. Hoffman and Clarence H. Wiegman, Williamsport, Pa., assignors, by mesne assignments, to Aviation Manufacturing Corporation, Chicago, Ill., a corporation of Delaware Application November 19, 1934, Serial No. 753,614

18 Claims. (Cl. 123—52)

The invention relates to internal combustion engines and more particularly to the means for supplying a combustible mixture of fuel and air to the engine.

In internal combustion engines used in aircraft power plants, it has been found advantageous to use a supercharger for delivering air under pressure to the engine cylinders to increase the density of the fuel vapor and air mixed therewith and thereby increase the volumetric efficiency and reduce the weight per horse power. Another advantage of a supercharger is that it increases the velocity of the aircraft at high altitudes by maintaining approximately constant power while the resistance of the aircraft is reduced. When supercharging is employed, the correct metering of fuel by means of conventional carburetors becomes more difficult or uncertain and the use of fuel injection has been found to be more efficient with a supercharger. Fuel injection also has advantages in eliminating the pressure drop across the carburetor with a corresponding increase in volumetric efficiency and in fuel distribution because the fuel can be injected at or near the individual cylinders and independently of the manifolding, and results in a more uniform distribution of power, smoother operation, and more uniform temperature conditions among the several cylinders.

When a supercharger is used the temperature of the air is increased by the compressor. This increase in temperature between the compressor and the cylinders decreases the volumetric efficiency of the charges delivered to the cylinders.

One object of the invention is to provide an internal combustion engine which is equipped with a supercharger and injectors and includes novel means for increasing the volumetric efficiency of the charges delivered to the cylinders by reducing the temperature of or cooling the air between the compressing means which raises its temperature and the cylinders or the injectors. Such cooling is also utilized to reduce the temperature of the fuel in ducts in the manifold through which the air passes and to reduce the temperature of the fuel passing to the injectors to prevent its premature vaporization.

Another object of the invention is to provide an engine of the type under consideration having improved means for fuel distribution which reduces the cost of maintenance by providing for easy removal and replacement of the injectors by mounting them on the manifold cover so they can be removed and replaced with a minimum amount of labor and cost.

A further object of the invention is to provide an internal combustion engine having improved means for fuel distribution which minimizes the fire hazard by locating the injectors in the intake manifold so that any leakage of fuel will be carried into the engine cylinders by the air flowing through the manifold under pressure to the cylinders.

Other objects of the invention will appear from the following detailed description.

The invention consists in the several novel features hereinafter set forth and more particularly defined by claims at the conclusion hereof.

In the drawings:

Fig. 1 is a plan of an internal combustion engine embodying the invention. Fig. 2 is an enlarged transverse section through the manifold of the engine, taken on the line 2—2 of Fig. 1. Fig. 3 is a section of the engine through one of the opposed pairs of power cylinders. Fig. 4 is an inverted plan of the intake manifold cover. Fig. 5 is a longitudinal section of the engine showing the mechanism for driving the compressor for delivering air into the intake manifold. Fig. 6 is a transverse section showing the mechanism for driving the fuel pump. Fig. 7 is a section through one of the fuel injectors. Fig. 8 is a transverse section through a modified form of intake manifold.

The invention is exemplified in an aircraft type, internal combustion engine comprising opposed banks of cylinders $a$, a crank-case $b$, a crank-shaft $c$ driven by the pistons $e$ in the cylinders, a rotary air compressor or pump $d$, a manifold $f$ through which the compressor delivers air under pressure to the engine cylinders, a series of injectors $g$ for delivering vaporized fuel to the cylinders, respectively, and a fuel pump $h$ for delivering timed charges of fuel to the injector.

The compressor $d$ comprises a casing with an air inlet 10, and a rotor or impeller 11 provided with blades 12 for delivering air under pressure through the outlet 13 into the rear open end of the manifold $f$. The compressor $d$ is driven from the crank-shaft $c$ through gearing comprising a shaft 45 splined to the rear end of the crank-shaft; a beveled gear 46 driven by shaft 44; a gear 47 fixed to rotate with gear 46$^a$; a set of pinions 48 engaging gear 47 and connected each to drive a helical gear 49 through a hydraulic drive 50; and a helical pinion 50′ meshing with gears 49 and provided with a shaft 51 to which the rotor or impeller 11 is splined.

The fuel pump $h$ is of the type which delivers charges of fuel through individual connections to the injectors in timed relation with the piston movements of the cylinders, respectively, so that at the proper moments the fuel will be delivered into the cylinders at the time when the intake valves *k* are open. The fuel pump *h* is driven from beveled gear 46 through gearing comprising a beveled gear 53 which meshes with the beveled gear 46, a shaft 54 fixed to said gear; a pinion 55 fixed to rotate with shaft 54 and an internal gear 56 meshing with pinion 55 and secured to drive the shaft 57 of the fuel pump *h*.

The manifold *f* is disposed on the top of the crankcase *b* and intermediate the two opposed banks of cylinders *a* and comprises a channel-shaped body having an integral bottom wall 14 and side walls 15 and an open top with a cover-plate 16 fitting over the open top. The manifold is, removably secured to the crank-case *b* of the engine by a series of studs 17 which extend through the cover-plate 16 and side walls 15 of the manifold and have their lower ends screwed into upwardly extending walls 18 which are integral with the sections of the crank-case *b*, respectively, and nuts 19 which are adapted to clamp the cover and the walls 15 to the engine-casing. The cover-plate 16 is removable separately from the body of the manifold.

Each power cylinder *a* has its inlet duct 21 for fuel connected by a mixing-tube 20 to one side of the manifold *f* to receive air from the manifold and vaporized fuel from the associated injector *g* in the manifold. The inner end of each tube is open and is secured by a packing box 22 in a side wall of the manifold to prevent leakage of fluid around the pipe.

Each injector comprises a fitting or casing 23, which is provided with a flange 26 and a stem 27 which extends through a hole in the cover 16 of the manifold. A nut 28 screw-threaded to the stem 27 serves to support each injector from the manifold cover 16 so that the injectors are removable with the cover. Each injector also comprises a laterally and outwardly extending nozzle 29 which is screw-threaded into the casing 23; a valve 30 adapted to seat on the end of the nozzle and provided with a slidable stem 31 which is provided with helical grooves 32; a spring 33 for holding the valve 30 closed against the end of the nozzle and engaging a plunger 34 threaded to the inner end of the stem 31. An inlet port 35 is formed in the casing 23. The fine grooves 32 are provided to discharge the injected fuel against the valve 30 at high velocity to vaporize the fuel.
When a charge of fuel in timed relation to the piston movements in the cylinders is forced through duct 35 by the fuel pump *h* the pressure will open the valve against the force of spring 33 and deliver the vaporized fuel into its associated mixing-tube 20. A deflector-ring 36 is supported by arms 37 which are integral with a hub which is screw-threaded to the nozzle 20.

The inlet duct 35 of each injector is connected by a union coupling 38ª to a pipe 38 which terminates at the top face 39 of the manifold cover 16 to conduct liquid fuel to the injector. The charges of fuel are delivered from the fuel pump *h* through a series of pipes 40 for delivering liquid-fuel individually to the pipes 38 which terminate at the face 39 of the manifold cover-plate 16. These pipes 40 have their outlet terminals secured in a head 41 which is removably secured by bolts to the top of the manifold, and they terminate in registry with the pipes 38 in the manifold, respectively. A packing pad 42 is interposed between head 41 and face 39 to prevent leakage. The pipes 40 are preferably enclosed in a sheath pipe 43 which leads from the pump *h* and which has its inner end secured to head 41 by a screw coupling ring 44ª. The other ends of pipes 40 are connected to the pump *h* which is provided with mechanism for timing the delivery of the charges through the fuel feed pipes in synchronism with the piston movements of the engine, so that a charge of fuel will be injected into each cylinder at the proper times.

The fuel pipes 39 extend longitudinally from the points where they terminate in registry with pipes 40 to points adjacent the injectors to which they are respectively connected. The under face of the cover 16 of the manifold *f* is provided with a series of depending longitudinal fins or ribs 45 and its top side is provided with a series of upwardly extending longitudinal ribs or fins 46, all of said fins extending approximately from one end of the manifold to the other. The function of these fins 45 is to extract heat from the compressed air flowing through the manifold to the mixing-tubes 20 and surrender it through the wall of the cover-plate 16 to the external fins 46, which are exposed to atmosphere so that the temperature of the air will be reduced at a constant pressure and a greater weight of oxygen will be induced into the cylinders on the suction stroke, thus making it possible to obtain a greater amount of power from each cylinder at a given speed, or to obtain equal power with a reduction in absolute manifold pressure and increasing the volumetric efficiency between the compressor *d* and the engine cylinders.

The longitudinally extending portions of the fuel pipes 39 are located between the longitudinal fins 45, which maintain the fuel pipes at a somewhat lower temperature than would exist if they were mounted elsewhere and this reduction in temperature lessens the possibility of premature vaporization of the fuel.

The injector nozzles require occasional cleaning or adjustment to deliver equal amounts of fuel to the engine cylinders. It is difficult to determine by observation of the engine alone which of the nozzles may be malfunctioning. For this purpose, it is advantageous to provide a convenient assembly consisting of the manifold cover-plate 16, the injectors *g* and fuel pipes 38, which can be unitarily connected to a separate fuel charger at the pad 42 when the unit has been removed or separated from the manifold. By disconnecting the head 41 from the cover-plate 16 and removing the nuts 19, the cover 16, with the injectors *g* and fuel pipes 39 attached, may be readily removed for this purpose.

The tubes 20 which deliver vaporized fuel and compressed air to the inlets of the engine cylinders, extend obliquely downward from the sides of the manifold with their inner ends perpendicular thereto, so that the upper portions of mixing-tubes 20 on the opposite sides of the manifold will be further apart than their lower portions. The stems 23 of the injectors, which are supported from the manifold cover 16, extend obliquely from the cover-plate and substantially parallel to the inner end of the associated tubes 20. As a result, when the discharge ends of the injectors are disposed substantially in the inclined planes of the inner ends of tubes 20, the cover can be lifted, there being clearance for the outer ends of the injectors. If it is desired to have the nozzle jets of the indicators extend further into the tubes 20 and it is desired to remove them, the cover 16 can be moved laterally until the nozzles at one side will clear the inner ends of the associated tubes 20. The nozzles at that side will then permit that side of the cover to be lifted until the injectors at the other side can be tilted or manipulated out of their inlet tubes so that the entire cover and all of the injectors can be removed. This construction permits considerable latitude in the position of the nozzles with respect to the inlet ends of tubes 20 without affecting the removability of the manifold cover and injectors.

By mounting the fuel pipes 38 on the inner side of the cover and inside of the manifold, any leakage of fuel at the couplings 38ª between the pipes 39 and the injector casings 23 will be carried into the cylinders and consumed and the fire hazard is reduced.

In operation, the compressor $d$ will constantly deliver compressed air at a high velocity into the manifold, through which it will pass longitudinally to the mixing-tubes 20. The fuel pump $h$ will deliver timed charges to the injectors $g$ for delivery into the tubes 20 in which the compressed air and vaporized fuel will be mixed in transit to the engine cylinders. Compressing of the air will raise its temperature and during the passage of the air longitudinally through the manifold, the interior fins or ribs 45 will extract heat from the compressed air in the manifold and surrender it through the cover-plate 16 and the exterior fins 46 to the air flowing longitudinally over the outside of the manifold at constant pressure, which results in a greater weight of oxygen being induced in the cylinders on the suction stroke, to obtain a greater amount of power from each cylinder at a given speed or to obtain equal power with a reduction in the absolute manifold pressure. When it is desired to test or adjust the injectors, it is only necessary to detach the head 41 from the manifold cover-plate and to remove said cover-plate on which the fuel pipes 38 and injectors are mounted, as previously described.

The invention exemplifies an internal combustion engine equipped with a supercharger or compressor for delivering air for mixture with injected vaporized fuel, in which means is provided for cooling or reducing the temperature of the air after it has been compressed and is in transit to the engine cylinders through the manifold to increase the efficiency or the amount of power developed by the engine. It also exemplifies cooling means which affects the individual fuel pipes leading to the injectors to reduce the temperature of the fuel to minimize the possibility of premature vaporization of the liquid fuel. It also exemplifies a manifold with a cover or member on which the injectors and fuel pipes are unitarily mounted to facilitate the inspection, repair, replacement or adjustment of the injectors.

The invention is not to be understood as restricted to the details set forth, since these may be modified within the scope of the appended claims without departing from the spirit and scope of the invention.

What we claim as new and desire to secure by Letters Patent is:—

1. In an internal combustion engine, the combination of a plurality of cylinders, a crankshaft, a manifold connected to deliver fluid to the cylinders, a compressor driven from the crank-shaft for delivering air under pressure into the manifold for delivery to the cylinders, and means for delivering fuel under pressure to mix with the air in transit from the manifold to the cylinders, including separate ducts located in the manifold for heat-transference between the fuel and the compressed air in the manifold, the manifold being provided with cooling means.

2. In an internal combustion engine, the combination of a bank of in-line cylinders, a crankshaft, a manifold extending longitudinally of the bank of cylinders and connected to deliver fluid to the cylinders, a compressor driven from the crank-shaft, for delivering air under pressure into the manifold for delivery to the cylinders, means for delivering fuel under pressure to mix with the air in transit from the manifold to the cylinders including separate ducts located in the manifold for heat-transference between the fuel and the compressed air in the manifold, the manifold being provided with cooling means.

3. In an internal combustion engine, the combination of a plurality of cylinders, a crankshaft, a manifold connected to deliver fluid to the cylinders, a compressor driven from the crank-shaft for delivering air under pressure into the manifold for delivery to the cylinders, means for delivering fuel under pressure to mix with the air in transit from the manifold to the cylinders including separate ducts located in the manifold for heat-transference between the fuel and the compressed air in the manifold, and injectors for the cylinders respectively disposed in the manifold, the manifold being provided with cooling means.

4. In an internal combustion engine, the combination of a bank of in-line cylinders, a crankshaft, a manifold extending longitudinally of the bank of cylinders and connected to deliver fluid to the cylinders, a compressor driven from the crank-shaft for delivering air under pressure into one end of the manifold for delivery to the cylinders, means for delivering fuel under pressure to mix with the air in transit from the manifold to the cylinders including separate ducts located in and extending longitudinally of the manifold, for heat-transference between the fuel and the compressed air in the manifold, and injectors for the cylinders respectively disposed in the manifold, the manifold being provided with cooling means.

5. In an internal combustion engine, the combination of a plurality of cylinders, a crankshaft, a manifold connected to deliver fluid to the cylinders, a compressor driven from the crank-shaft for delivering air under pressure into the manifold for delivery to the cylinders, and means for delivering fuel under pressure to mix with the air in transit from the manifold to the cylinders, including separate ducts located in the manifold for heat-transference between the fuel and the compressed air in the manifold, the manifold being provided with internal cooling fins.

6. In an internal combustion engine, the combination of a plurality of cylinders, a crankshaft, a manifold connected to deliver fluid to the cylinders, a compressor driven from the crank-shaft for delivering air under pressure into the manifold for delivery to the cylinders, and means for delivering fuel under pressure to mix with the air in transit from the manifold to the cylinders, including separate ducts located in the manifold for heat-transference between the fuel and the compressed air in the manifold, the manifold being provided with internal and external cooling fins.

7. In an internal combustion engine the combination of a pair of banks of in-line cylinders, a crank-shaft, a manifold extending longitudinally of the banks of cylinders and connected to deliver fluid to the cylinders of both banks, a compressor driven from the crank-shaft, for delivering air under pressure into the manifold for delivery to the cylinders, and means for delivering fuel under pressure to mix with the air in transit from the manifold to the cylinders including separate ducts, located in the manifold, for heat-transference between the fuel and the compressed air, the manifold being provided with cooling means.

8. In an internal combustion engine, the combination of a pair of banks of in-line cylinders, a crank-shaft, a manifold extending longitudinally of the banks of cylinders and connected to deliver fluid to the cylinders of both banks, a compressor driven from the crank-shaft, for delivering air under pressure into the manifold for delivery to the cylinders, means for delivering fuel under pressure to mix with the air in transit from the manifold to the cylinders including separate ducts located in the manifold, for heat-transference between the fuel and the compressed air in the manifold, and injectors for the cylinders respectively disposed in the manifold, the manifold being provided with cooling means.

9. In an internal combustion engine, the combination of a bank of in-line cylinders, a crank-shaft, a manifold extending longitudinally of the bank of cylinders and connected to deliver fluid to the cylinders, a compressor driven from the crank-shaft for delivering air under pressure into the manifold for delivery to the cylinders, means for delivering fuel under pressure to mix with the air in transit from the manifold to the cylinders including separate ducts located in the manifold, for heat-transference between the fuel and the compressed air, and injectors for the cylinders respectively disposed in the manifold.

10. In an internal combustion engine, the combination of a pair of banks of in-line cylinders, a crank-shaft, a manifold extending longitudinally of and between the banks of cylinders and connected to deliver fluid to the cylinders of both banks, a compressor driven from the crank-shaft for delivering air under pressure into one end of the manifold for delivery to the cylinders, means for delivering fuel under pressure to mix with the air in transit from the manifold to the cylinders including separate longitudinally extending ducts located in the manifold, for heat-transference between the fuel and the compressed air, and injectors for the cylinders respectively disposed in the manifold.

11. In an internal combustion engine, the combination of power cylinders and a crank-shaft, an elongated manifold connected to deliver fluid to the cylinders, means driven by the crank-shaft for delivering compressed air into the manifold for passage to the cylinders, means for delivering fuel under pressure to mix with the compressed air in transit to the cylinders, and internal fins on, and extending longitudinally of, the manifold for cooling the compressed air passing through the manifold, said fuel delivery means comprising pipes extending lengthwise of and between the fins.

12. In an internal combustion engine, the combination of two banks of power cylinders, a crankcase between the banks, a crank-shaft in the case, an air compressor driven from the crank-shaft, a longitudinally extending manifold intermediate the banks of cylinders and into which the compressed air from the compressor is delivered, fuel delivery means including injectors in the manifold and fuel ducts also in the manifold leading to the injector, mixing pipes between the manifold and cylinders into which the fuel and compressed air are delivered, and internal cooling fins on the manifold.

13. In an internal combustion engine, the combination of power cylinders, a crank-shaft, a manifold comprising a removable cover-plate, means for delivering air into the manifold, fuel supply means comprising injectors and pipes for the fuel carried by the cover-plate and removable therewith, and means for conducting fuel to said pipes, terminating at and separable from the cover-plate.

14. In an internal combustion engine, the combination of power cylinders, a crank-shaft, a manifold into which air is delivered, comprising a removable cover-plate, mixing tubes between the manifold and the cylinders, and fuel-supply means comprising injectors in the manifold for discharging the fuel into said tubes, pipes also in the manifold for delivering the fuel to the injectors, said pipes and injectors being carried by, and removable with said cover-plate, and means for conducting fuel to said pipes.

15. In an internal combustion engine, the combination of power cylinders, a crank-shaft, a manifold into which air is delivered, comprising a removable cover-plate, mixing tubes between the manifold and the cylinders, and fuel-supply means comprising injectors for discharging the fuel into said tubes, pipes for delivering the fuel to the injectors, said pipes and injectors being carried by, and removable with said cover-plate, and means for conducting fuel to said pipes, terminating at and separable from the outside of the cover-plate.

16. In an internal combustion engine, the combination of power cylinders, a crank-shaft, a manifold into which air is delivered, comprising a removable cover-plate, mixing tubes between the manifold and the cylinders, injectors depending from, and removable with, the cover-plate and having nozzles directed to discharge the fuel into said tubes, pipes in the manifold for delivering the fuel to the injectors, carried by and removable with said cover-plate, and means for conducting fuel to said pipes.

17. In an internal combustion engine, the combination of two banks of power cylinders, a crank-shaft, a manifold into which air is delivered, comprising a removable cover-plate, mixing tubes between the manifold and the cylinders, arranged in banks in the manifold, injectors in the manifold for discharging the fuel into said tubes, means in the manifold for delivering the fuel to the injectors removable with said cover-plate, and means for conducting fuel to said delivery means.

18. In an internal combustion engine, the combination of two banks of power cylinders, a crank-shaft, a manifold into which air is delivered, comprising a removable cover-plate, mixing tubes between the manifold and the cylinders, arranged in banks in the manifold, injectors adapted to discharge the fuel into said tubes and having divergent depending stems secured to the cover-plate, means in the manifold for delivering the fuel to the injectors removable with said cover-plate, and means for conducting fuel to said delivery means.

SAMUEL K. HOFFMAN.
CLARENCE H. WIEGMAN.